June 4, 1963  M. G. GOODELL ETAL  3,092,041
COACH AND SUSPENSION THEREFOR
Filed Feb. 23, 1956  5 Sheets-Sheet 3
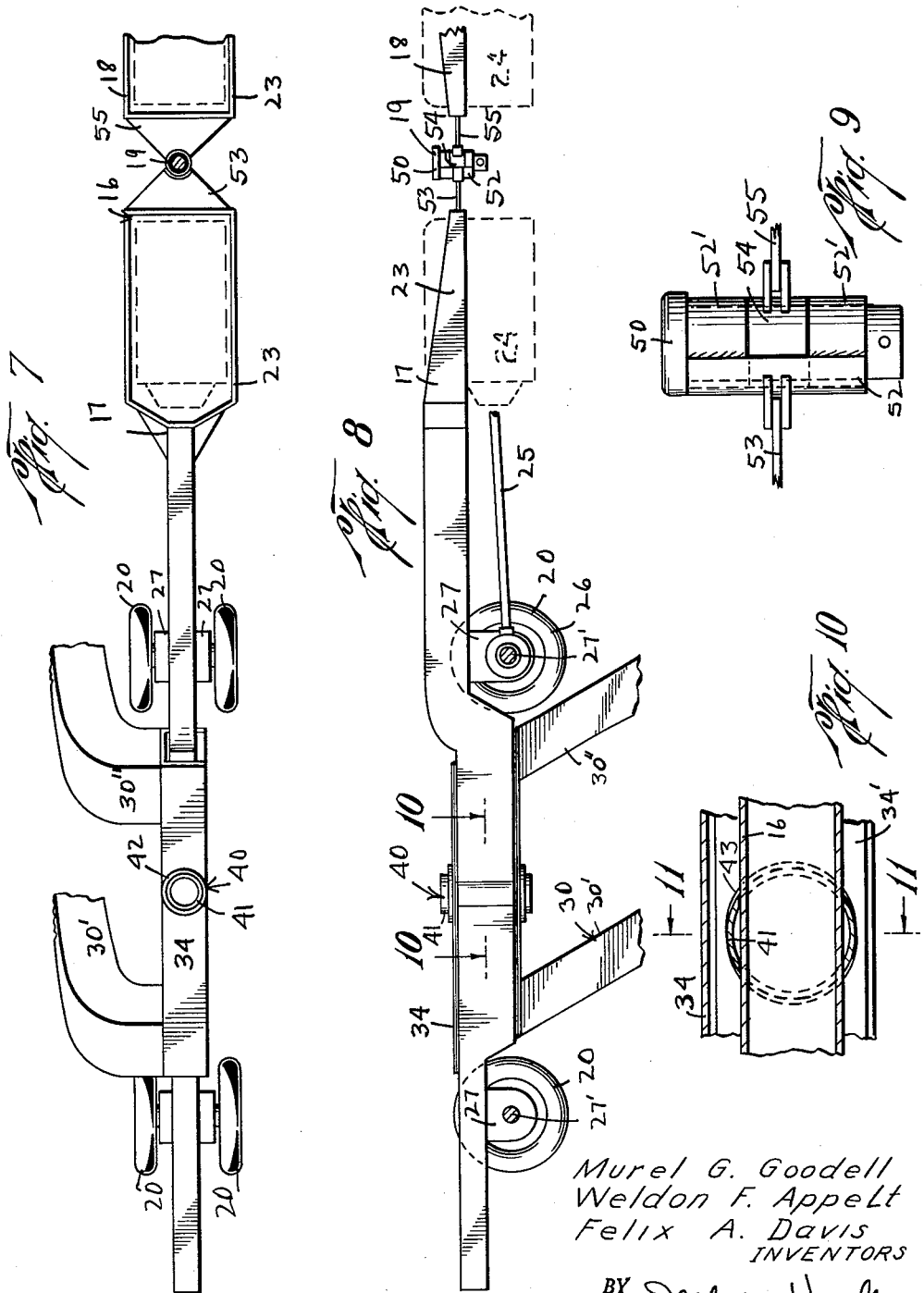
Murel G. Goodell
Weldon F. Appelt
Felix A. Davis
INVENTORS
BY *Jarls W. Hayden*
ATTORNEY

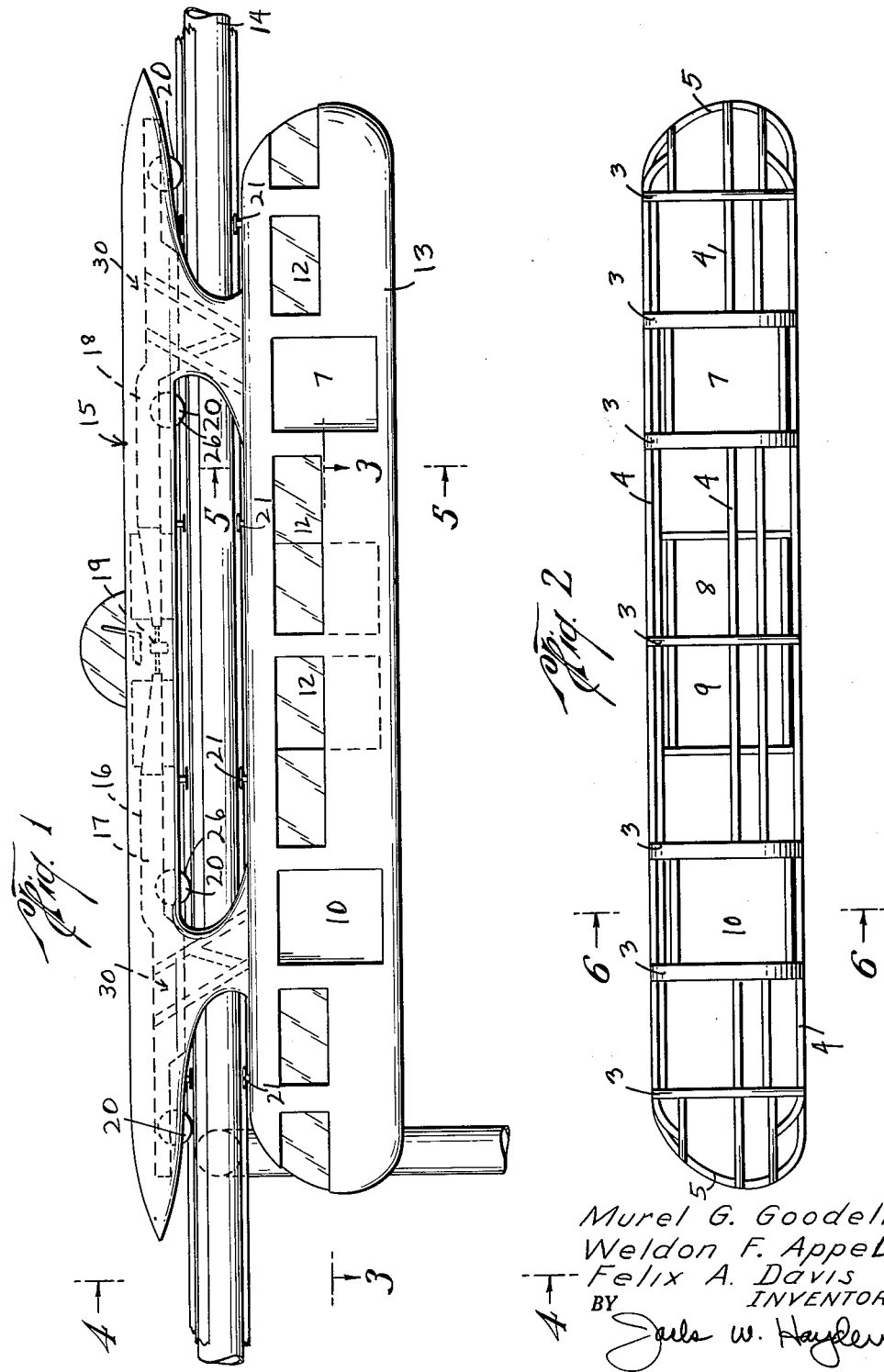

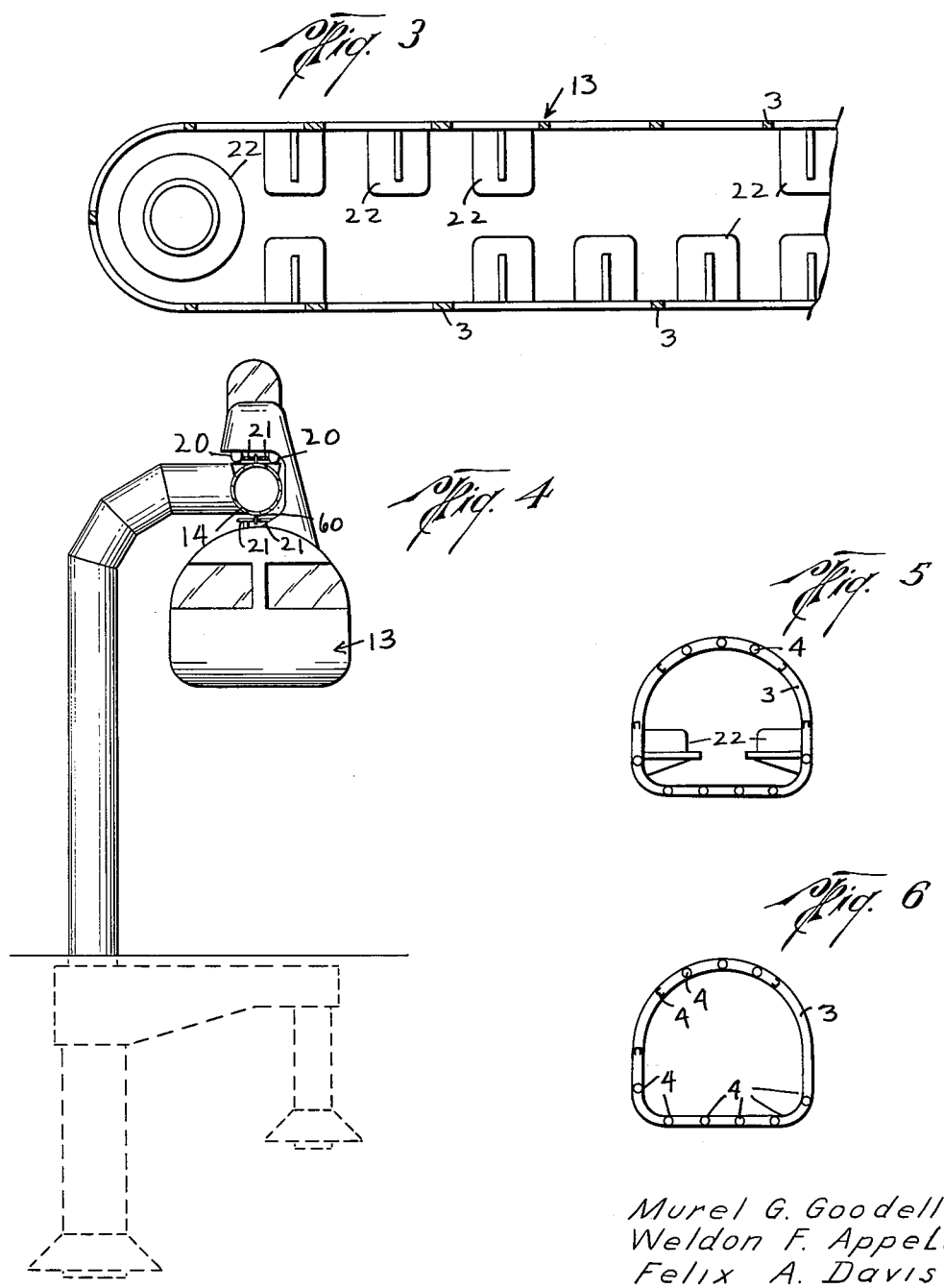

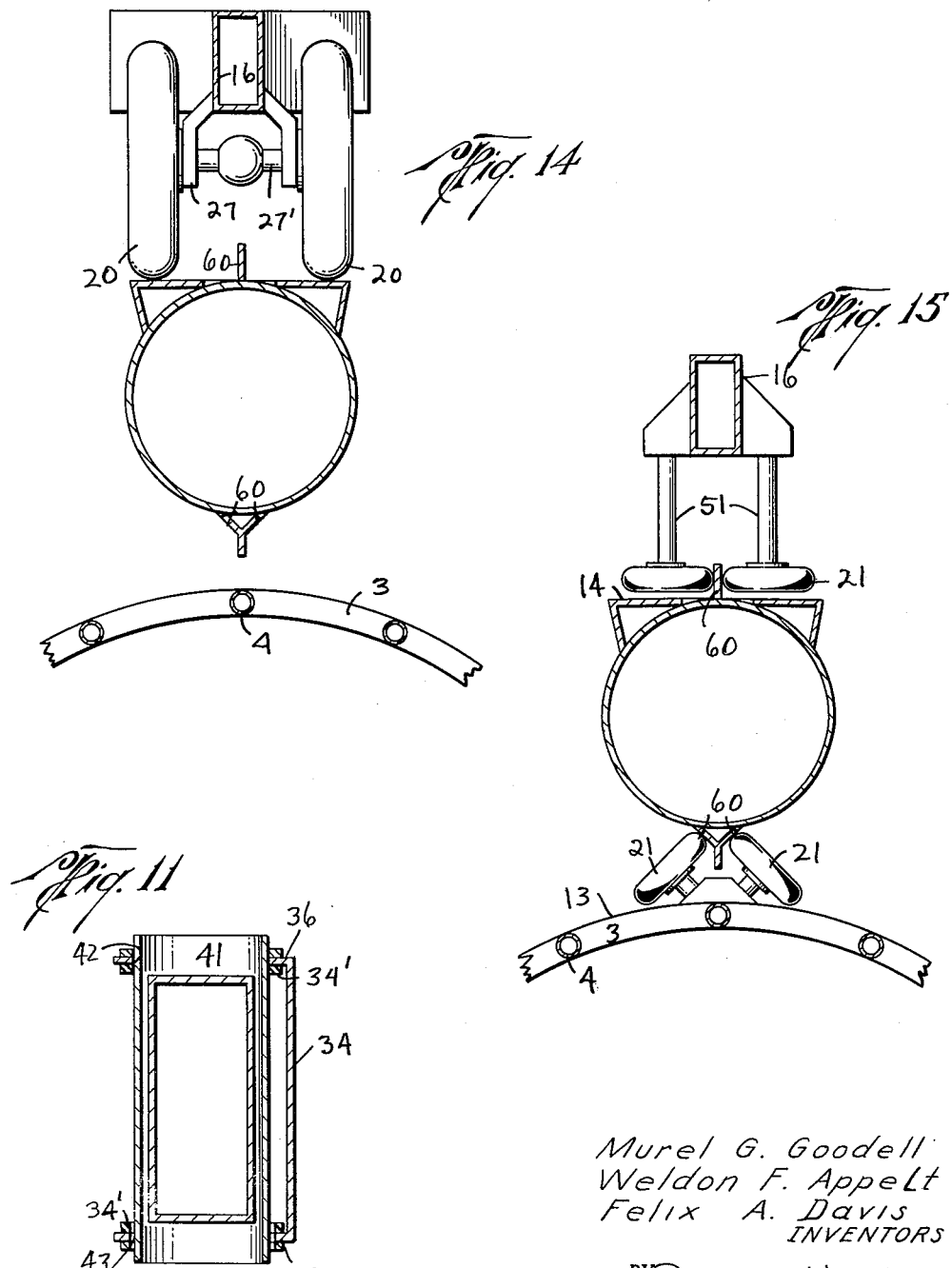

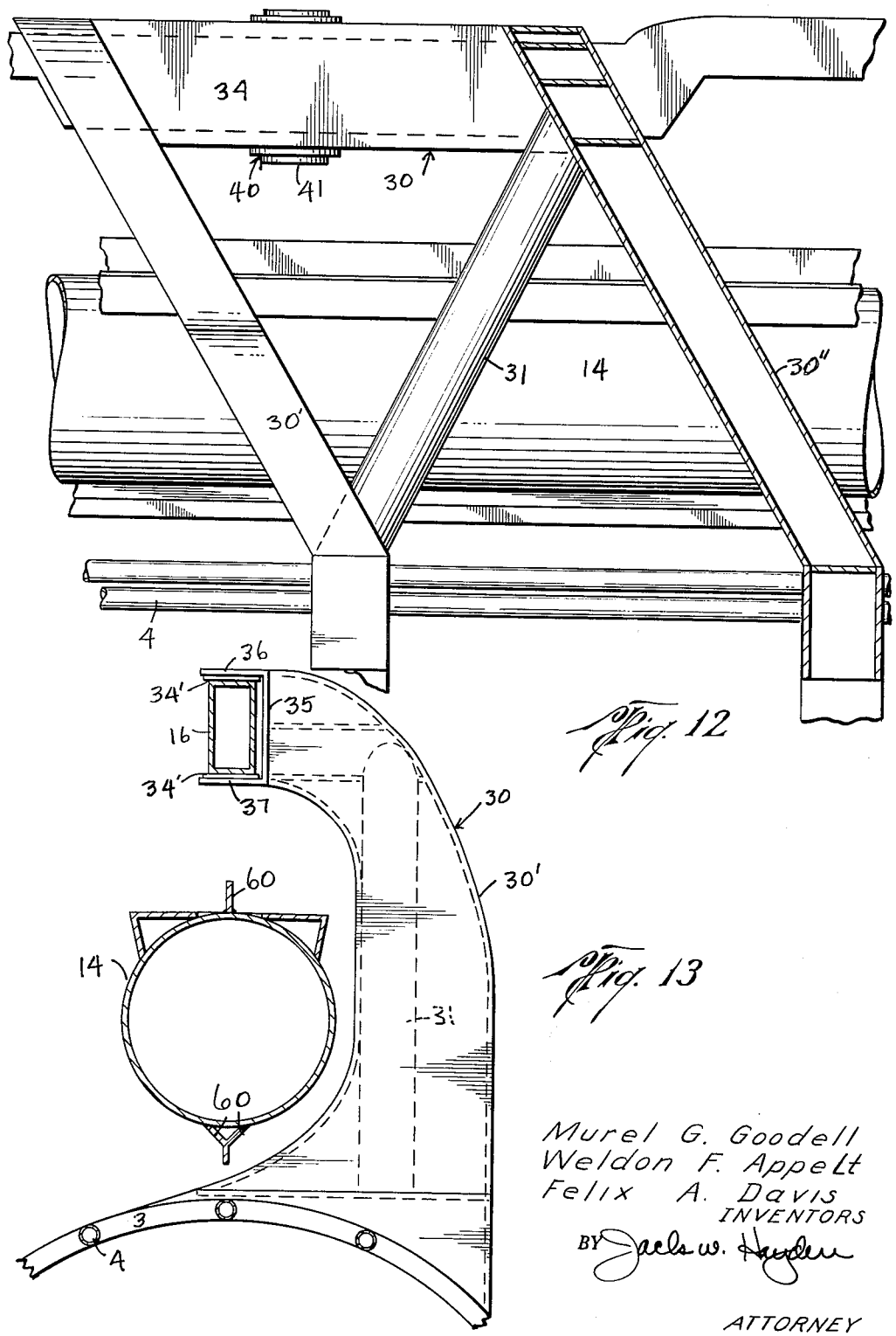

United States Patent Office 3,092,041
Patented June 4, 1963

3,092,041
COACH AND SUSPENSION THEREFOR
Murel G. Goodell, Weldon F. Appelt, and Felix A. Davis, Houston, Tex., assignors, by mesne assignments, to Alwac International, Bahamas, British West Indies, a corporation of Panama
Filed Feb. 23, 1956, Ser. No. 567,100
6 Claims. (Cl. 105—153)

The present invention relates to a coach and a suspension arrangement for supporting the coach on an elevated track.

An object of the present invention is to provide a suspension arrangement for a coach on an elevated track which suspension reduces to a minimum the noise between the track and the coach as the coach moves therealong and which resists lateral or rolling movement of the coach relative to the longitudinal axis of the track due to side thrusts from wind or other forces.

Another object of the invention is to provide a suspension arrangement for hanging a coach on an elevated track which suspension is constructed and arranged to accommodate relative movement between portions thereof and the coach as the coach moves along the track so as to compensate for curves, grades and other factors which may tend to cause relative movement between portions of the suspension and the coach.

Still another object of the invention is to provide a coach formed of a plurality of concentric ring members connected together by longitudinally extending beams to form a structure which is statically indeterminate.

Still another object of the invention is to provide a coach construction and hanger therefor for movement along an elevated track which coach and hanger construction is relatively inexpensive to build, yet strong enough to accomplish its desired functions.

Yet a further object of the invention is to provide a suspension construction for supporting a coach on an elevated track which construction includes a beam that extends longitudinally of the coach and above the track and is connected to the coach suspended below the track by means of hanger hooks whereby the beam and coach move together along the track.

Still another object of the invention is to hang a coach from an elevated track by means of a beam which extends longitudinally of the coach and above the track, which beam is divided into two half sections that are pivotally joined together to provide for flexibility in the beam, hanger hooks securing the coach and beam together, with hooks being provided adjacent each end of the coach and there being a flexible connection between the hooks and the beam to accommodate relative movement therebetween.

Still another object of the invention is to provide a suspension for a coach frame on an elevated track which suspension is constructed and arranged to accommodate relative movement between the coach and suspension.

Other objects and advantages of the present invention will become more readily apparent from a consideration of the following description and drawings wherein:

FIG. 1 is a side elevation showing one design of the coach and hanger assembly mounted on an elevated track;

FIG. 2 is a side elevation showing the preferred embodiment of the coach frame construction wherein a plurality of concentric rings are joined by longitudinally extending frame members to form a statically indeterminate structure;

FIG. 3 is a sectional view on the line 3—3 of FIG. 1 showing a form of seating arrangement which may be used in a passenger coach;

FIG. 4 is an end view on the line 4—4 of FIG. 1 showing the coach suspended on the elevated track by the hanger arrangement of the present invention;

FIG. 5 is a sectional view on the line 5—5 of FIG. 1 showing a form of the interior seating arrangement and schematically illustrating the arrangement of the longitudinally extending frame members;

FIG. 6 is a sectional view on the line 6—6 of FIG. 2 showing one of the concentric rings of the frame in elevation with the longitudinally extending frame members illustrated schematically in section;

FIG. 7 is a plan view showing a portion of the assembly beam which extends longitudinally of the coach and above the track and provides a means for connecting the various elements of the hanger arrangement including the wheels, etc., to the coach;

FIG. 8 is a side view of the beam illustrated in FIG. 7 showing the wheels and drive assembly and the manner of securing the beam to the hangers of each end of the coach;

FIG. 9 is an enlarged view showing the manner of connecting each half of the assembly beam adjacent the middle of the coach for accommodating relative movement between each part of the assembly beam;

FIG. 10 is a sectional view on the line 10—10 of FIG. 8 showing the manner of connecting the coach hanger to the beam;

FIG. 11 is a sectional view on the line 11—11 of FIG. 10;

FIG. 12 is an enlarged side view, partly in section, showing the construction of the hangers;

FIG. 13 is an enlarged end view of the hanger showing the relationship thereof and its arrangement relative to the track along which the coach moves;

FIG. 14 is a sectional view, partly in elevation, showing the wheels mounted on the assembly beam and in turn supported on the track; and FIG. 15 shows the auxiliary support wheels on the beam and coach for engaging fins on opposite sides of the track for supporting the coach as it moves along the track and to inhibit rolling or movement of the coach about or laterally relative to the track.

The tower and rail construction shown in this application is described and claimed in our copending application Serial No. 567,101 filed February 23, 1956, for an invention in "Elevated Track and Support Structure Therefor."

In FIG. 2 attention is directed to the structural details of the preferred embodiment of a coach of the present invention. It is to be noted that a plurality of concentric annular members or rings 3 are spaced as illustrated in the drawings and are connected by longitudinally extending members 4 which members may be formed of channels or tubular pieces.

It seems obvious that the size of the coach as well as the load it is to accommodate will in part determine the exact spacing of the members 3 and their size as well as the arrangement and spacing of the longitudinally extending members 4 connected therebetween.

If the coach is to accommodate baggage or freight, it may be provided with additional members 3 and additional longitudinally extending members 4 to provide additional strength for the added weight of the baggage or freight as compared with the weight of a normal loaded passenger coach. The members 4 are bent at each end of the coach and joined to the downwardly curved end 5 of one of the longitudinally extending beams 4 that extends substantially along the longitudinal center of the top and bottom of the coach.

Ingress and egress passageways 7, 8, 9 and 10 are illustrated in FIG. 2 of the drawings and it should be obvious that such passageways can be arranged in the coach in any suitable manner to provide for rapid loading and unloading of the coach while not interfering with the interior arrangement of the coach so as to accommodate a maximum number of passengers or a maximum amount of freight. Suitable exterior panels may be positioned on the framework in any manner such as by welding, bolting or the like, such panels being formed of light weight material, preferably of plastic. Windows 12 may be arranged in the coach as desired to provide light therefor and visual observation by the passengers in the coach.

The coach in the completed form is shown at 13 in FIG. 1 as being suspended or hanging on the track 14 along which it is adapted to move.

A suspending arrangement indicated generally by the numeral 15 supports or hangs the coach 13 on the track for movement therealong. FIGS. 7–14 show the details of the preferred embodiment of the supporting arrangement of the present invention. Generally speaking, the supporting arrangement includes a beam 16 with hangers 30 mounted thereon and depending therefrom which beam extends longitudinally of the coach 13 and above the track 14. The hangers 30 connect the beam 16 and coach 13 together, which hangers are as previously mentioned secured or mounted on the beam 16 at their upper ends and are fastened to the coach 13 at their lower ends. One hanger may be arranged adjacent each end of the coach as illustrated in FIG. 1 of the drawings.

The longitudinally extending beam 16 is divided into two separate but identical portions 17 and 18 which are pivotally joined together at 19 to provide some flexibility in the beam 16. Both FIGS. 7 and 8 show the portion 17 of the beam 16 and only a part of the bam portion 18. However, as previously mentioned, the beam 18 is identical in construction and arrangement with the beam 17 which is shown in FIGS. 7 and 8.

The beam 16 is of a desired size and configuration and is formed of suitable material such as mild structural steel in order to support the loads and strains to which it will be subjected. The configuration of the beam 16 may, if desired, be rectangular as illustrated in the drawings. Each of the beam portions 17 and 18 includes a frame portion 23 to receive the motor means and drive mechanism for the coach 13. The motor means and drive mechanism is illustrated by the numeral 24 and is schematically illustrated in FIGS. 7 and 8 of the drawings. While two of such motor means and driving mechanisms are illustrated, one for each beam portion 17 and 18, it should be appreciated that additional motor means and drive mechanism may be provided, if desired.

A drive shaft 25 is represented in FIG. 8 of the drawings and connects the schematically illustrated motor means and drive mechanism 24 through suitable gears with the drive wheels 26. The drive wheels 26 are similar in construction to all of the other wheels 20, which are mounted on the beam portions 17 and 18, whereby the coach 13 may be rolled therealong.

The wheels 20 are connected to the beam portions 17 and 18 by any suitable means such as the braces 27 which depend from the beam portions 17 and 18, and as illustrated in FIG. 14 of the drawings, such braces may be in the form of a yoke through which the axle 27' connected between the wheels 20 extends. Suitable bearing means may be provided in the braces 27 for supporting the axle 27' of the wheels 20. It is believed unnecessary to give a detailed description of the bearing mounting and axle assembly for the tandem wheels 20 as such constructions are well known in the art.

The hangers 30 of the suspending arrangement 15, as previously mentioned, are secured to the beam 16 at their upper ends and also to the coach 13 at their lower ends whereby the coach 13 and the beam 16 are joined together for movement along the track or rail 14. As illustrated in FIG. 1 of the drawings, a hanger 30 is provided adjacent each end of the coach.

The structural details of the hangers are best seen in FIGS. 12 and 13 of the drawings wherein one of the hangers is shown. Each hanger includes paired arms 30' and 30" which are in spaced relationship and joined together by the brace member 31 which extends diagonally between them. It will be noted that the members 30' and 30" are inclined relative to the horizontal as shown in FIG. 12 of the drawings. The hanger shown in FIG. 12 is for the front end of the coach 13, whereas the hanger for the rear end of the coach would have its arms 30' and 30" inclined in the direction opposite to that shown in FIG. 12. The arrangement of the inclined arms 30' and 30" of each of the hangers 30 is illustrated by dotted line in FIG. 1 of the drawings. The hangers 30 are formed of suitable material such as mild structural steel of sufficient thickness and configuration to support the coach 13 under maximum loaded conditions.

The arms 30' and 30" are connected at their upper ends by means of the hanger yoke 34 which is substantially rectangular in cross-section and is provided with only three sides, namely, the back or web 35, top 36 and bottom 37. The fourth side of the yoke 34 is opened as best viewed in FIGS. 11 and 13 of the drawings. It will be further noted that the hanger arms 30' and 30" are in the form of an inverted or reversed C arrangement so that when the lower ends of the arms 30' and 30" of each of the hangers 30 are connected to the coach 13, and the coach then positioned beneath the track 14, the upper ends of each of the arms 30' and 30" of the hanger 30 will overlie the track 14 as will be more fully described hereinafter. This arrangement is more clearly illustrated in FIG. 13 of the drawings.

The hanger yoke 34 is adapted to receive the beam 16 as shown in FIGS. 7, 8, 12 and 13 and is secured to the beam 16 by means of the flexible connection designated generally by the numeral 40. The flexible connection 40 is provided to accommodate movement of each of the beam portions 17 and 18 relative to the coach 13 or accommodates other relative movement which may occur between the suspension arrangement 15 and the coach 13.

The flexible connection designated generally by the numeral 40 may be seen in FIGS. 7, 8 and 12 and is illustrated in more detail in FIGS. 10 and 11 of the drawings. The arrangement includes a projection or pin 41 which is secured through each of the beam portions 17 and 18 and is adapted to extend through the opening 42 in the top 36 and the opening 43 in the bottom 37 of the hanger yoke 34. It will be noted that the opening 43 in yoke 34 is oblong so that the pin 41 may move backwards or forwards therein. The hanger yoke 34 is provided with a thick covering of resilient material 34' such as rubber or the like on the inside surface of the ends 36 and 37. Such covering may be of a suitable thickness to provide the necessary flexibility between the hangers 30 and beams 16 and may be secured to the yoke 34 by any means well known in the art. Movement of either of the beam portions 17 or 18 in relation to its respective hanger yoke 34 in a vertical plane will cause the pin 41 to move backward or forward in opening 43 and the beam 16 will move to depress the resilient material 34' within the hanger yoke 34. The beam will of course return to its normal position within the hanger yoke 34 when the forces urging relative movement between the beam and hangers 30 are relieved.

The pin 41 also provides a means of pivotally connecting the hangers 30 and connected coach 13 to the beam portions 17 and 18 so as to accommodate lateral movement of the portions 17 or 18 of the beam 16 relative to the hangers 30 and the coach 13 secured thereto. As previously mentioned, the beam 16 by means of the pivot connection 19 between the two identical portions 17 and 18 accommodates bending or other relative horizontal movement which may occur in the support assembly 15.

The pivot arrangement 19 is illustrated in more detail in FIG. 9 of the drawings and includes a pin 50 which extends through the collar 52 secured on the end 53 of the beam portion 17 and through the collar 54 secured on the end 55 of the beam portion 18. It will be noted that collar 52 is provided with straps 52' which are spaced relative to each other whereby the collar 54 may be positioned between the straps 52'. The collar 54 is thus rotatably mounted within the collar 52 and the two are secured together by the pin 50.

FIG. 3 illustrates one form of interior seating arrangement which may be used in the coach, it being noted that seats 22 are provided at desired spaced intervals to accommodate a maximum number of passengers within the coach. The seats 22 may be arranged in any desired manner within the coach and the illustration in FIG. 3 is merely by way of example.

In FIG. 4 the coach 13 is shown suspended on the track 14 with the auxiliary wheels 21 in operative engagement with fin portions 60 on the track to aid in eliminating rolling of the coach, such figure showing also the wheels 20 which accommodate movement of the coach along the track.

In FIG. 5 one of the rings or concentric members 3 is shown in end elevation with the longitudinally extending members 4 schematically illustrated as being circumferentially spaced about the member 3. The arrangement of the seats 22 shown in FIG. 3 of the drawings is further detailed to better illustrate one arrangement.

FIG. 6 shows the ring member 3 in elevation with the longitudinally extending members 4 spaced about the ring to provide for maximum strength to resist the stresses and strains which will be encountered under the most adverse conditions.

In FIG. 14 the wheels 20, the braces 27 and the beam 16 are shown in their proper relationship. It is to be noted that the wheels depend below the beam 16 as shown also in FIGS. 1, 4 and 8 of the drawings so that the beam 16 is in elevated position relative to the top of the track 14. The position of the beam 16 in relation to the top of the track and to the wheels is best seen in dotted line of FIG. 1 of the drawings.

In FIG. 15 the auxiliary support wheels 21 are shown as depending downwardly from the beam 16 and as being supported on the arm 51 so that the wheels 21 may engage the upstanding plate or fin 60 extending centrally of the track or rail 14. Also, support or auxiliary wheels 21 secured to the top of the coach 13 in any suitable manner such as that illustrated in FIG. 15 engage projecting surfaces 60 on the bottom of the track 14 so that such wheels both above and below the track help to prevent rotation of the coach about the track as it moves therealong. Any suitable number of support wheels may be provided, depending upon the load to be carried in the coach 13, and as shown in FIG. 1 of the drawings, they may be spaced at suitable intervals longitudinally of the coach. This arrangement prevents rolling of the coach due to wind forces or other stresses which may be acting on the coach to tend to move it about the track 14.

While it is believed that the invention is apparent by reason of the foregoing to further amplify and describe, it will be assumed that it is desired to assemble the invention as illustrated in each of the figures of the drawings.

As previously mentioned, track or rail 14 and its support structure is described and claimed in our copending application Serial No. 567,101 and reference is made thereto for a detailed description of this phase of the invention.

The coach 13 illustrated in FIGS. 2, 3, 5 and 6 is formed by securing ring shaped members 3 together by means of the longitudinally extending braces or beams 4. The braces and ring members 3 may be joined by suitable means such as welding to provide a unitary frame structure which is statically indeterminate. The term "statically indeterminate" defines the relationship of the beams 4 and ring shaped members 3 in that the forces therein exerted are in proper balance. The longitudinally extending members 4 are positioned circumferentially about the ring shaped members 3 so as to attain the maximum strength for which the coach construction is to be used. As previously mentioned, any suitable number of rings 3 and longitudinally bracing beams or members 4 may be used, depending upon the strength desired in the frame structure of the coach. Plastic panels and doors may be positioned on the coach by well known means such as by bolting for the panels and door hangers of any well known construction for supporting the doors in the openings 7, 8, 9 and 10 provided therefor.

The hangers 30 are formed of suitable material such as mild structural steel of a suitable thickness and a desired configuration to obtain the desired strength. It will be noted as previously mentioned, that the hangers 30 are secured at their lower ends to the top of the coach 13 and extend upwardly relative thereto at an angle therewith as shown in FIGS. 1 and 12 of the drawings. The hanger 30 at the forward end of the coach extends forwardly, while the hanger 30 at the rear of the coach extends upwardly and rearwardly. The two portions 17 and 18 of the beam 16 are joined at their pivot connection 19 and the wheels 20 and prime mover mechanism 24 are secured in position on the beam. The hanger yoke 34 extending between the arms 30' and 30" is positioned about the portions 17 and 18 of the frame 16 so as to receive the pins 41 on such beam 16 within the openings 42 and 43 of the hanger yoke 34.

The support wheels 21 are mounted on beam 16 and coach 13 so as to engage the fin surfaces 60 and 60' on the rail to prevent rolling or rocking of the coach about the rail as it moves therealong.

The pivotal connection 19 between the two half portions of the beam 16 accommodates movement in a horizontal plane between the fore and aft portions of the beam as, for example, when the coach moves around a curve. The arrangement of a pin 41 in the opening of the yoke 34 permits the beam 16 to move in a horizontal plane relative to the hanger arms 30' and 30" as well as accommodating vertical movement in relation to such arms as, for example, when the coach starts to move up an incline.

It is clearly obvious that the suspending assembly of the present invention not only hangs a coach on an elevated track, but such suspension also accommodates relative movement between certain parts of the suspension mechanism and the vehicle suspended.

Broadly the invention relates to a coach construction and a suspending assembly for supporting the coach on an elevated track.

What is claimed is:

1. A suspension arrangement for suspending a coach for movement along an elevated track and for accommodating relative movement between the suspension and coach comprising a beam extending longitudinally of the coach, substantially the full length thereof, and in spaced relation thereabove, wheels mounted on said beam for movement along the elevated track, hanger hooks mounted pivotally on said beam adjacent the opposite ends thereof and connected to the coach adjacent the opposite ends thereof to connect the coach for movement along the track with said beam, said beam and hangers having a yieldable connection therebetween for accommodating any relative movement between said beam and hangers as the coach and beam move along the elevated track, said beam being formed of two longitudinally extending portions, a pivot construction having a substantially vertical pivot axis pivotally connecting the adjacent ends of said beam portions substantially midway between said hangers to provide for further flexibility in said beam to accommodate relative movement therein, said pivot construction including means to prevent relative movement of said beam portions in a direction longitudinally of said coach.

2. A suspension arrangement for suspending a coach on an elevated track comprising a beam formed of two portions which are pivotally joined together so that relative horizontal swinging movement between said portions may be accommodated; a first hanger pivotally mounted on one of said portions, a second hanger pivotally mounted on the other of said portions, said hangers including spaced parallel arms inclined relative to the vertical and of a general inverted C configuration, a hanger yoke connected between said arms at the upper end thereof, a substantially vertical projection on said beam portion, there being an opening in said yoke whereby said projection on said beam portion may be received therein whereby said hanger is pivotally mounted on said portion, a layer of resilient material in said hanger and abutting said beam, the opening in said yoke being larger than said projection to accommodate relative movement of said projection therein, said resilient material being deformable upon relative movement of said projection in the yoke opening to accommodate relative movement between said beam and hanger yoke, said arms being secured to said coach at their lower ends, and wheels mounted on each of said beam portions whereby the coach may be moved along the elevated track.

3. A suspension arrangement for suspending a coach on an elevated track comprising a beam formed of two portions which are pivotally joined together to form said beam so that relative lateral swinging movement between said portions may be accommodated, a first hanger mounted on one of said portions, a second hanger mounted on the other of said portions, each of said hangers including spaced parallel arms inclined relative to the vertical and of a general inverted C configuration, a hanger yoke connected to said arms at the upper end thereof, a substantially vertical projection on said beam portion, there being an opening in said yoke whereby said projection on said beam portion may be received therein whereby said hanger is pivotally mounted on said portion, the opening in said yoke being larger than said projection to accommodate relative movement between said beam portion and hanger, said arms each being secured to said coach at their lower ends, wheels mounted on each of said beam portions whereby the coach may be moved along the elevated track, and additional guide wheels mounted on said beam and said coach, respectively, for engaging fin portions of the elevated track to inhibit rolling of the coach about the longitudinal axis of the track.

4. A suspension arrangement for suspending a coach on an elevated track comprising a beam formed of two portions which are pivotally joined together above the longitudinal center of said coach to form said beam so that relative horizontal swinging movement between said portions may be accommodated, hangers mounted on each of said portions, said hangers including spaced parallel arms inclined relative to the vertical and of a general inverted C configuration, a hanger yoke connected to said arms at the upper end thereof, a substantially vertical projection on said beam portions, there being an opening in said yoke whereby said projection on said beam portion may be received therein whereby said hanger is pivotally mounted on said portion, a layer of resilient material in said hanger and abutting said beam, the opening in said yoke being larger than said projection to accommodate relative movement of said projection therein, said resilient material being deformable upon relative movement of said projection in the yoke opening to accommodate relative movement between said beam and hanger yoke, said hangers each being secured to the coach at their lower ends, wheels mounted on each of said beam portions whereby the coach may be moved along the elevated track, and additional guide wheels mounted on said beam for engaging a fin portion of the elevated track to inhibit rolling of the coach about the longitudinal axis of the track.

5. A coach frame construction and suspension arrangement for supporting the coach frame on an elevated track comprising, a plurality of spaced transverse annular members, longitudinal members extending between and connected to said annular members, said members forming a statically indeterminate coach frame, means supporting said coach frame on the elevated track for movement therealong, said means including a pair of beam sections extending longitudinally of said coach frame above said track, pivot means having a substantially vertical axis connecting the adjacent ends of said beam sections for relative lateral movement while preventing relative longitudinal movement, hanger hooks pivotally secured at their upper ends to said beam sections at opposite sides of said pivot means for pivoting movement about a substantially vertical axis and rigidly secured at their lower ends to said coach frame adjacent the opposite ends thereof whereby said frame and said beam portions are connected together, and wheels on said beam portions whereby said beam portions and connected coach frame may be moved along the elevated track.

6. A suspension arrangement for hanging a coach on an elevated track comprising an articulated beam formed with two portions the adjacents ends of which are joined together by a pivot construction having a substantially vertical axis, a first hanger mounted on one of said beam portions, a second hanger mounted on the other of said beam portions, each of said hangers including spaced parallel arms inclined relative to the vertical and of general inverted C configuration, a hanger yoke connected to the upper ends of said arms, a substantially vertically extending projection on each of said beam portions, there being an opening in said yoke whereby said projections on said beam portions may be received therein whereby said hanger is pivotally mounted on said beam portions, the opening in said yoke being larger than said projection to accommodate relative movement between said beam portion and said hanger longitudinally of said beam, said arms each being secured to said coach at their lower ends, and wheels mounted on each of said beam portions whereby the coach may be moved along the elevated track.

References Cited in the file of this patent

UNITED STATES PATENTS

| 365,340 | Hamilton | June 21, 1887 |
|---|---|---|
| 767,863 | Brown | Aug. 16, 1904 |
| 890,852 | Ellingen | June 16, 1908 |
| 1,106,102 | Lindeman | Aug. 4, 1914 |
| 1,152,564 | Smith | Sept. 7, 1915 |
| 1,355,801 | Shoemaker | Oct. 12, 1920 |
| 1,430,186 | Rasmussen | Sept. 26, 1922 |
| 1,544,263 | Montgomery | June 30, 1925 |
| 1,740,416 | Combs | Dec. 17, 1929 |
| 1,789,872 | Kruckenberg et al. | Jan. 20, 1931 |
| 1,833,002 | Smith | Nov. 24, 1931 |
| 1,896,859 | Wylie et al. | Feb. 7, 1933 |
| 2,020,540 | Dunlap | Nov. 12, 1935 |
| 2,470,060 | Webb et al. | May 10, 1949 |
| 2,578,671 | Chausson | Dec. 18, 1951 |
| 2,595,212 | Ledwinka et al. | Apr. 29, 1952 |
| 2,614,508 | Archambault | Oct. 21, 1952 |
| 2,697,990 | Parsons et al. | Dec. 28, 1954 |
| 2,728,819 | Hauss | Dec. 27, 1955 |

FOREIGN PATENTS

| 269,299 | Germany | Jan. 16, 1914 |